Nov. 20, 1928.   J. R. BLACKHALL   1,692,109
DRAWBAR
Filed June 13, 1927   2 Sheets-Sheet 1
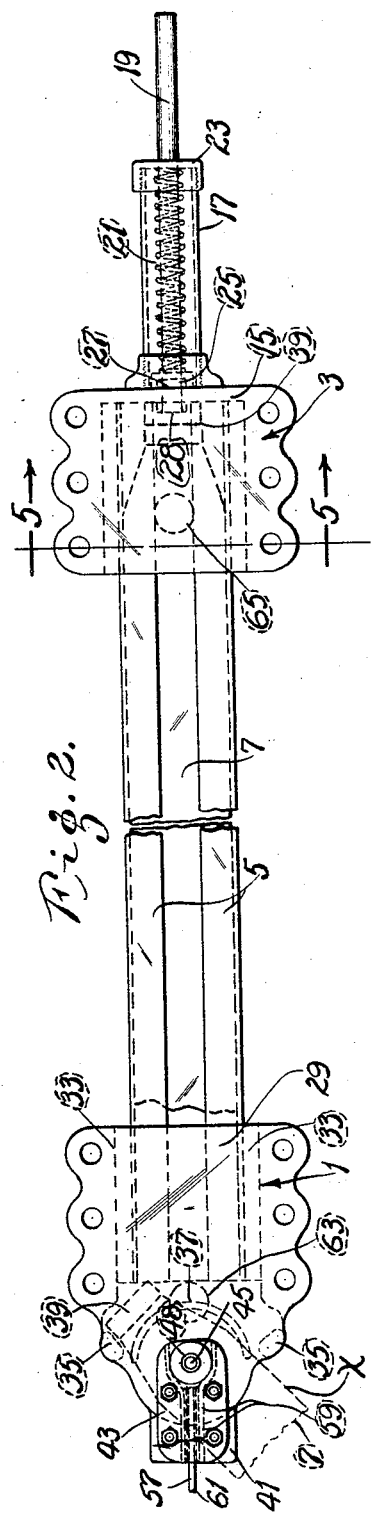
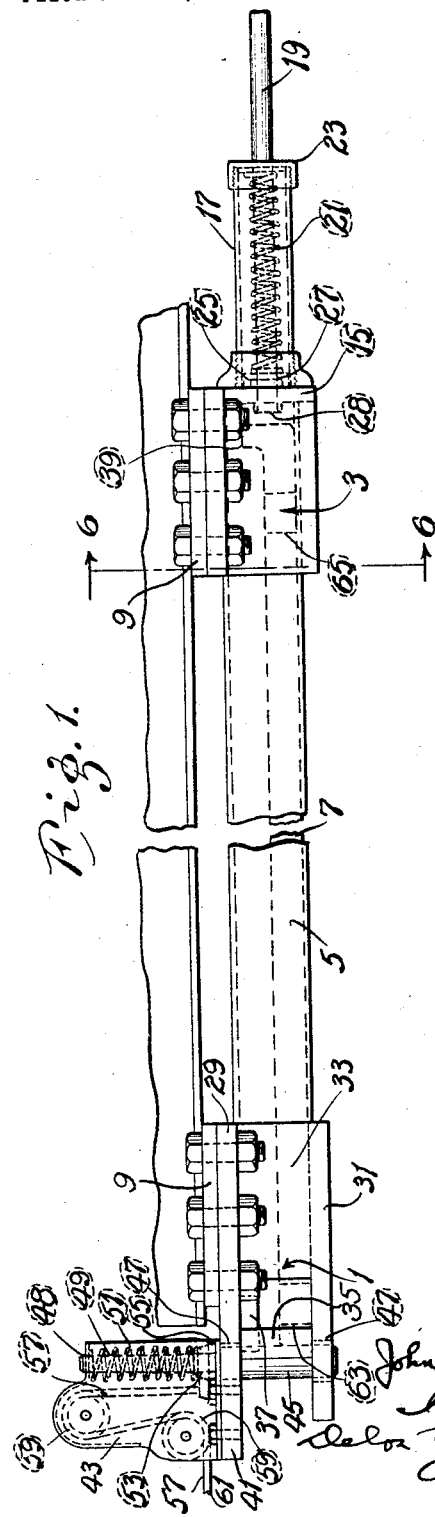
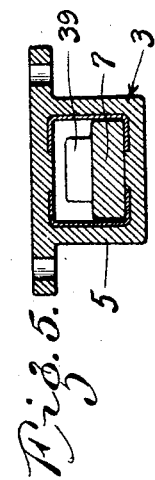
John Robert Blackhall
Inventor
Delos G. Haynes
Attorney

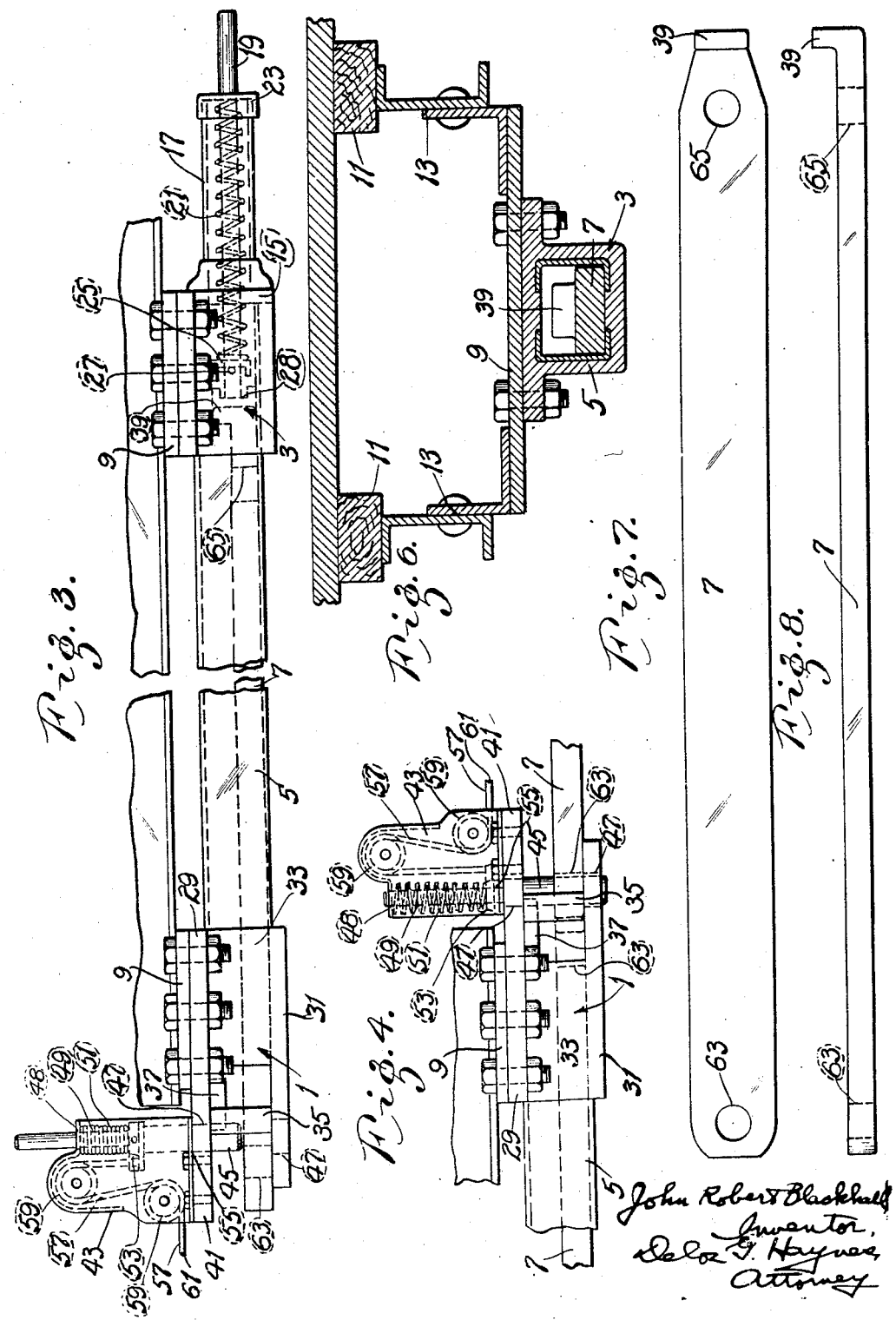

Patented Nov. 20, 1928.

1,692,109

UNITED STATES PATENT OFFICE.

JOHN ROBERT BLACKHALL, OF JOLIET, ILLINOIS.

DRAWBAR.

Application filed June 13, 1927. Serial No. 198,410.

This invention relates to a drawbar construction and with regard to certain more specific features, to non-removable telescoping drawbars for coupling vehicles.

Among the several objects of the invention may be noted the provision of an improved telescoping drawbar construction, wherein means is provided for preventing unauthorized removal; the provision of a drawbar of the class described which is normally carried in a non-interfering position on the vehicle and which, when in use as a coupling, provides all the flexibility had with previous forms of drawbars; the provision of a drawbar of the class described which is adapted to reduce the shock usually attending the coupling of two vehicles and the provision of a device of the class described which is rugged in construction, simple to operate and economical in first cost and upkeep. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which is illustrated one of various possible embodiments of the invention, Fig. 1 is a side elevation of the drawbar construction, showing the bar per se, in a recessed position;

Fig. 2 is a plan view of Fig. 1, showing also an alternate swiveled position of said bar, certain attachment plates being removed;

Fig. 3 is a side elevation similar to Fig. 1 but showing the drawbar sprung forward;

Fig. 4 is fragmentary view of another drawbar head made according to this invention, showing the drawbar connected for coupling two vehicles;

Fig. 5 is a cross section taken on line 5—5 of Fig. 2;

Fig. 6 is a cross section taken on line 6—6 of Fig. 1, and shows the construction for mounting the drawbar on a vehicle;

Fig. 7 is a plan view of the drawbar per se; and

Fig. 8 is a side elevation of the draw bar per se.

Similar reference characters indicate corresponding parts throughout the several views of the drawings.

Referring now more particularly to Fig. 1, there are illustrated at numerals 1 and 3 a drawbar head and a drawbar bumping box respectively. This head 1 and the box 3 are connected by means of drawbar guides 5, said guides having channel shapes adapted to slidably receive therebetween a drawbar 7 (see also Figs. 7 and 8).

The head 1 and box 3 are adapted to be bolted to attachment plates 9, said plates 9 being suspended from the vehicle frame 11 by means of suitable channel and angle-iron constructions 13 (see also Fig. 6). The positions of the head 1 and box 3 relative to one another is a matter of choice, depending upon the amount and position of the space available beneath the vehicle, such as a street railway car. However, a position approximating a longitudinal one is preferable.

Referring now to the rearwardly located box 3 (Figs. 1 to 3), it may be seen that it includes a rearward wall 15 which carries a rearwardly extending pocket 17. The pocket 17 is removable and slidably carries a pusher pin 19 and also houses a spring 21. The function of the spring 21 is to react against the rear end 23 of the pocket 17 and against a washer 25 (suitably held to the pin 19 by a locking pin 27) so that the pin 19 is normally pushed into a forward position. The maximum forward positioning is adapted to set a forward head 28 on said pin 19 in a forward position in the box 3. The proportions of the pocket 17, pin 19 and spring 21 are such that, when desired, the head 27 may be pushed rearwardly to a point where it engages the wall 15.

Referring now to the head 1, it will be seen that it comprises a top wall 29, a bottom wall 31, side walls 33 and swing-limiting columns or abutments 35. The top wall 29 extends forwardly a somewhat greater distance than the bottom wall 31 and is provided with an arcuate stop 37. The stop 37 is adapted to be engaged by an upwardly turned lip 39 on the rear end of the drawbar 7, when said drawbar is pushed or pulled forward, thereby preventing complete removal of said drawbar. The columns 35 aid in preventing said removal and limiting the swing which the drawbar 7 can make.

Above the forwardly extending portion 41 is fastened a casting 43 which slidably carries a vertically positioned drawbar pin 45, which pin 45 constitutes a locking means. The pin 45 has a thick lower portion which in its normal down position cooperates with two holes 47 in the upper and lower walls 29 and 31 respectively. The pin also has a reduced upper portion 49 carrying a spring 51 which reacts against an upper portion of the casting 43 and a collar 53 fastened to a portion of said reduced upper portion 49 for the purpose of normally holding down the pin 45. The complete pin is guided by the holes 47 and an upper hole 48 in the casting 43. An alternate upward position of the pin is shown in Fig. 3.

Below the collar 53 is provided a lifting member 55, fastened to a length of cable 57, for the purpose of lifting the pin 45 against the reaction of the spring 51. This cable 57 passes over idler pulleys 59 located in the casting 43. A suitable grip (not shown) is provided at the other end of the cable 57 for purposes to be described. It is evident that if the outer end 61 of the cable 57 be pulled, that the drawbar pin 45 will be temporarily raised and if said outer end 61 be released, that the pin 45 will automatically return. The cable may be made any length so that said grip may be placed in an accessible position.

The drawbar 7 per se comprises a heavy shank having formed therein a forwardly located hole 63 and a rearwardly located hole 65, both holes 63 and 65 being adapted to be engaged by the drawbar pin 45. The length of the drawbar 7 per se is such that when the lip 39 engages the head 28 of the pusher pin 19 and is then partially pushed back so that the spring 21 is compressed, then the drawbar pin 45 may be dropped down entirely ahead of the drawbar as illustrated in Figs. 1 and 2, or said pin may be dropped down through the forwardly located hole 63.

In order to couple the car, it is only necessary to pull the cable 57, thereby raising the pin 45 and permitting the spring 21 to push the drawbar 7, per se, forward far enough for the operator to grasp the drawbar (Fig. 3) and pull it out so that the lip 39 engages the stop 37 (see alternate position X, Fig. 2). At or about the time that said engagement takes place, the pin 45 automatically drops into the rear hole 65 of the drawbar. Hence, the drawbar is then coupled to the car on which it is mounted, ready for towing or pushing. Fig. 2 shows the limiting alternate angular position X of the drawbar, such as it may assume while in coupled position.

In Fig. 4 is shown how the forward hole 63 of the drawbar is coupled to another drawbar head of the class herein described. In order to accomplish this coupling, the other pin 45 to be engaged by the hole 63 is pulled up, whereupon its corresponding drawbar springs forward some distance. Then the drawbar 7 on the other car (which has already been pulled out so as to have its rearward hole 65 engaged by the pin 45) is engaged end to end with the said forwardly sprung drawbar. The vehicles are then brought together and the forwardly sprung drawbar is pushed in by the drawbar which is to function as a coupling until the coupling drawbar reaches such a position that the pin 45 on the opposite car drops into the forward hole 63 of said coupling drawbar.

It will be seen that the spring 21 functions to absorb some of the shock. The wall 15 is also made strong enough to withstand the shock, if the spring 21 does not take it all up. It is evident that the engaging pin 45 for the outer hole 63 may be left to drop into place automatically under action of the spring 51 or may be engaged by manually manipulating the cable 57.

One of the advantages of the present invention is that the springs 51 and 21 prevent the drawbar pin 49 and the drawbar 7 from rattling when the drawbar is in recessed or telescoped position.

In the present coupling practice, cars are equipped with drawbar heads and a straight removable drawbar with holes in each end which is loosely hung on hooks under the body of the car between the trucks when the drawbar is not in use. It frequently happens that when cars are required to be coupled together that the drawbar is missing, it having been either misplaced or stolen. The hanging bars also rattle.

With the present invention, the drawbar is safely stowed away in a position which is not unsightly and cannot be completely detached so as to be unavailable when required for use. All rattling is prevented. The telescoping feature makes it unnecessary for an operator to lift the entire dead weight of a drawbar when coupling two cars. The fact that he can manipulate the drawbar pin 45 by means of the cable 57, without touching said pin 45, is conducive to safety.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. The drawbar construction for vehicles comprising guide means located on a vehicle, a drawbar telescoping said guide means, resilient means located rearwardly on said guide means adapted to be engaged by the rear end of said drawbar, a movable pin located forwardly on said guide means and means for automatically engaging said pin with forward and rearward holes in the drawbar when said holes are suitably positioned beneath the pin.

2. The drawbar construction for vehicles comprising guide means located on a vehicle, a drawbar telescoping said guide means, resilient means located rearwardly on said guide means adapted to be engaged by the rear end of said drawbar, a movable pin located forwardly on said guide means, means for automatically engaging said pin with forward and rearward holes in the drawbar when said holes are suitably positioned beneath the pin and means for manually disengaging said pin from said holes without touching the pin, said automatic pin-engaging means and said resilient means preventing rattling of the pin and drawbar when the device is telescoped shut.

3. The drawbar construction for vehicles comprising a guide on the vehicle telescoped by a drawbar, means for positively preventing complete removal of the drawbar from the guide when untelescoped, said means permitting a swiveling of the drawbar, locking means associated with the guide adapted to lock the drawbar in telescoped position, and to lock the drawbar in pivotal connection when in untelescoped position, said locking means also being adapted to couple with the engaging end of a drawbar of another vehicle.

4. The drawbar construction for vehicles comprising a guide on the vehicle telescoped by a drawbar, means for positively preventing complete removal of the drawbar from the guide when untelescoped, said means permitting a swiveling of the drawbar, locking means associated with the guide adapted to lock the drawbar in telescoped position, and to lock the drawbar in pivotal connection when in untelescoped position, said locking means also being adapted to couple with the engaging end of a drawbar of another vehicle and resilient means associated with said guide adapted to press the drawbar against the locking means when telescoped and to automatically push said drawbar outwardly when the locking means is released.

5. The drawbar construction for vehicles comprising a guide on the vehicle telescoped by drawbar, means for locking the drawbar in a pivotal manner when untelescoped and for locking it in telescoped position, and resilient means associated with said guide adapted to press the drawbar against the locking means when telescoped and to automatically push said bar outwardly when the locking means is released.

6. The drawbar construction for vehicles comprising a guide on the vehicle telescoped by drawbar, means for locking the drawbar in a pivotal manner when untelescoped and for locking it in telescoped position, and resilient means associated with said guide adapted to press the drawbar against the locking means when telescoped and to automatically push said bar outwardly when the locking means is released, said resilient means being adapted to absorb shock from the drawbar when the drawbar of another vehicle is coupled.

7. The drawbar construction for vehicles comprising a guide on the vehicle telescoped by drawbar, means for locking the drawbar in a pivotal manner when untelescoped and for locking it in telescoped position, and resilient means associated with said guide adapted to press the drawbar against the locking means when telescoped and to automatically push said bar outwardly when the locking means is released, said resilient means being adapted to absorb shock from the drawbar when the drawbar of another vehicle is coupled and means associated with the guide and the drawbar adapted to positively prevent removal of the drawbar when untelescoped and when said locking means is unlocked.

8. The drawbar construction for vehicles comprising a guide on the vehicle telescoped by drawbar, means for locking the drawbar in a pivotal manner when untelescoped and for locking it in telescoped position, and resilient means associated with said guide adapted to press the drawbar against the locking means when telescoped and to automatically push said bar outwardly when the locking means is released, said resilient means being adapted to absorb shock from the drawbar when the drawbar of another vehicle is coupled and means associated with the guide and the drawbar adapted to positively prevent removal of the drawbar when untelescoped and when said locking means is unlocked, said locking means being automatically closable and adapted to be manually opened.

9. The drawbar construction for vehicles comprising guide means located on a vehicle, a drawbar telescoping said guide means, resilient means located rearwardly on said guide means adapted to be engaged by the rear end of said drawbar, a movable pin located forwardly on said guide means, means for automatically engaging said pin with forward and rearward holes in the drawbar when said holes are suitably positioned beneath the pin, means for manually disengaging said pin from said holes without touching the pin, said automatic pin-engaging means and said resilient means preventing rattling of the pin and drawbar when the device is telescoped shut and means for preventing complete detachment of the drawbar from the guide means when untelescoped and unpinned.

10. The drawbar construction for vehicles comprising a forward head a rearward box, and joining members therebetween forming guide means, a pocket formed rearwardly of said box having resilient means projecting therefrom and into said guide means, a drawbar adapted to telescope said guide means having a rearward hole therein and a rearward lip, the rearward portion of the drawbar being adapted to engage said resilient means, a forward hole in said drawbar, a pin located in said head adapted to maintain the drawbar in telescoped position against the reaction of said resilient means and adapted to engage said rearward hole, automatic means for maintaining said pin in its engaging positions, manual means for lifting said pin and means located on said forward head adapted to be engaged by said rearward lip of the drawbar when the drawbar is pulled forward so as to prevent complete disengagement.

In testimony whereof, I have signed my name to this specification this ninth day of June, 1927.

JOHN ROBERT BLACKHALL.